United States Patent
Hart (10) Patent No.: US 8,615,397 B2
(45) Date of Patent: Dec. 24, 2013

(54) IDENTIFYING AUDIO CONTENT USING DISTORTED TARGET PATTERNS

(75) Inventor: Matt E. Hart, Lunenburg, MA (US)

(73) Assignee: Intuit Inc., Mountain View, CA (US)

( * ) Notice: Subject to any disclaimer, the term of this patent is extended or adjusted under 35 U.S.C. 154(b) by 1291 days.

(21) Appl. No.: 12/098,016

(22) Filed: Apr. 4, 2008

(65) Prior Publication Data

US 2009/0254343 A1    Oct. 8, 2009

(51) Int. Cl.
*G10L 15/06* (2013.01)
*G10L 15/20* (2006.01)

(52) U.S. Cl.
USPC ............................................ 704/243; 704/233

(58) Field of Classification Search
None
See application file for complete search history.

(56) References Cited

U.S. PATENT DOCUMENTS

| | | | | |
|---|---|---|---|---|
| 4,720,802 A * | 1/1988 | Damoulakis et al. | .......... | 704/233 |
| 4,933,973 A * | 6/1990 | Porter | ............................ | 704/233 |
| 5,475,792 A * | 12/1995 | Stanford et al. | .............. | 704/233 |
| 5,655,057 A * | 8/1997 | Takagi | ............................ | 704/233 |
| 5,727,124 A * | 3/1998 | Lee et al. | ........................ | 704/233 |
| 5,854,999 A * | 12/1998 | Hirayama | ..................... | 704/226 |
| 5,884,262 A * | 3/1999 | Wise et al. | ................. | 704/270.1 |
| 6,381,569 B1 * | 4/2002 | Sih et al. | ........................ | 704/233 |
| 6,401,066 B1 * | 6/2002 | McIntosh | ...................... | 704/273 |
| 6,418,418 B1 * | 7/2002 | Nakamura | ...................... | 705/35 |
| 6,611,801 B2 * | 8/2003 | Erell | ............................. | 704/233 |
| 6,636,831 B1 * | 10/2003 | Profit et al. | .................... | 704/275 |
| 6,876,966 B1 * | 4/2005 | Deng et al. | ..................... | 704/233 |
| 6,957,185 B1 * | 10/2005 | Labaton | ......................... | 704/500 |
| 7,299,177 B2 * | 11/2007 | Broman et al. | ................ | 704/246 |
| 7,356,168 B2 * | 4/2008 | Tavares | ......................... | 382/115 |
| 7,451,085 B2 * | 11/2008 | Rose et al. | ..................... | 704/244 |
| 7,672,845 B2 * | 3/2010 | Beranek et al. | ................ | 704/251 |
| 7,895,039 B2 * | 2/2011 | Braho et al. | ................... | 704/251 |
| 2004/0064315 A1 * | 4/2004 | Deisher et al. | ................ | 704/233 |
| 2006/0286969 A1 * | 12/2006 | Talmor et al. | .................. | 455/415 |

OTHER PUBLICATIONS

ITU-T Recommendation G.711, "Pulse Code Modulation (PCM) of Voice Frequencies", 1972.*
Ng et al., "The Influence of Audio Compression on Speech Recognition", SPECOM'2004: 9th Conference, Sep. 2004.*
Moller et al., "Real-Time Telephone Transmission Simulation for Speech Recognizer and Dialogue System Evaluation and Improvement", 6th International Conference on Spoken Language Processing, Oct. 2000.*
Zuo et al., "Speech Conversion From Clean Conditions to Telephone Ones", Proceedings of the 5th World Congress on Intelligent Control and Automation, Jun. 2004.*

* cited by examiner

*Primary Examiner* — Brian Albertalli
(74) *Attorney, Agent, or Firm* — Park, Vaughan, Fleming & Dowler LLP; Steven E. Stupp (57) ABSTRACT

Embodiments of a system for identifying audio content are described. During operation, the system receives a data stream from an electronic device via a communication network. Then, the system distorts a set of target patterns which are used to identify the audio content based on characteristics of the electronic device and/or the communication network. Next, the system identifies the audio content in the data stream based on the set of distorted target patterns.

26 Claims, 4 Drawing Sheets

IDENTIFYING AUDIO CONTENT USING DISTORTED TARGET PATTERNS

BACKGROUND

The present invention relates to techniques for identifying audio content in a data stream received by a computer system.

Voice-recognition techniques, such as the techniques used by voice-recognition software in call centers, are becoming increasingly popular. These techniques facilitate a variety of applications by enabling users to provide verbal information to computer systems. For example, automated transcription software allows users, such as healthcare providers, to dictate voice messages that are subsequently converted into text.

However, the performance of existing voice-recognition applications is often highly sensitive to audio quality. Consequently, these applications are often optimized for use with high-quality audio data. Unfortunately, the quality of the audio data which is used by many applications, such as the quality of the audio data received by handheld devices that communicate via wireless communication, varies considerably. For example, the audio quality associated with cellular telephones can vary considerably from one phone call to another or even as a function of time within the same phone call. This variability often limits the usefulness of existing voice-recognition techniques with such handheld devices.

SUMMARY

One embodiment of this invention provides a system for identifying audio content. During operation, the system receives a data stream from an electronic device via a communication network. Then, the system distorts a set of target patterns which are used to identify the audio content based on characteristics of the electronic device and/or the communication network. Next, the system identifies the audio content in the data stream based on the set of distorted target patterns.

In some embodiments, the communication network is a wireless network. For example, the electronic device may include a cellular telephone, and the communication network may include a cellular-telephone network.

In some embodiments, the audio content includes spoken information.

In some embodiments, the system transcribes the audio content into text. Additionally, the system may associate the text with a financial transaction, which is associated with financial software, such as: payroll software, income-tax software, accounting software, and/or customer-relationship-management software.

In some embodiments, the set of target patterns corresponds to a dictionary of words.

In some embodiments, distorting the set of target patterns includes changing an amplitude of the set of target patterns at a given frequency in a range of audio frequencies. Note that the set of target patterns may be distorted using a filter and/or an encoding technique.

In some embodiments, the set of target patterns is distorted based on characteristics associated with a user of the electronic device.

Moreover, the distortion of the set of target patterns may include dynamic distortion. For example, the distortion may be based on: a confidence metric associated with the process of identifying the audio content; a dynamic characteristic of the data stream; and/or training data that is included in the data stream. This training data may include audio data for predetermined frequencies. Note that the training data may be associated with a predetermined phrase and/or with a predetermined key-pad pattern on the electronic device. Moreover, note that the training data may be sent by the electronic device without user action.

Another embodiment provides a method for identifying the audio content, which may be performed by the computer system. This method may include at least some of the preceding operations.

Another embodiment provides a computer-program product for use in conjunction with the computer system. This computer-program product may include instructions corresponding to at least some of the preceding operations. Moreover, this computer-program product may be implemented separately from the financial software or may be included in the financial software.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer-program product (i.e., software) for use with the computer system are described. These systems, software, and processes may be used to detect or identify audio content in a data stream, such as spoken information or a voice message provided by a user of an electronic device, such as a wireless device (for example, a cellular telephone). In particular, the audio content may be identified by distorting a set of target patterns (such as information associated with words in a dictionary) so that the distorted target patterns better match the spectral content (amplitude and phase) of the audio content over a range of audio frequencies, including the effects of: the electronic device, a communication channel in a communication network, and/or characteristics of the user's speech. This distortion may be implemented using a filter and/or an encoding technique.

Moreover, in some embodiments the distortion is dynamic, and may be adjusted based on: a confidence metric associated with the process of identifying the audio content (such as a performance metric associated with a voice-recognition technique); a dynamic characteristic of the data stream; and/or training data that is included in the data stream.

In some embodiments, the audio content is subsequently transcribed into text. This text may be associated with one or more of the user's financial transactions, which are associated with financial software, such as: payroll software, income-tax software, accounting software, and/or customer-relationship-management software. Moreover, the association may be based on: information provided by the user (such as a user identifier or an account number); an identifier associated with the electronic device (such as caller identification); and/or a user location (such as a position determined using a positioning system, such as the global positioning system).

By distorting the set of target patterns, this technique may improve the performance of a detection process associated with a wide variety of word-recognition techniques and/or related applications, such as Dragon Naturally Speaking™ (from Nuance, Inc. of Burlington, Mass.). For example, this technique may provide the benefits of a matched filter without appreciably increasing the noise of the data stream during the detection process. Consequently, the audio content may be identified: more accurately, faster, and/or with shorter training times than when the set of target patterns is not distorted. This technique may be useful when the set of target patterns includes information associated with a large dictionary of words, such as 300,000 words.

Note that these techniques may be implemented as a stand-alone software application, or as a program module or subroutine in another application, such as the financial software and/or voice-recognition software. Furthermore, the software application may be configured to execute on a computer, such as: a personal computer, a laptop computer, a cellular telephone, PDA, a server, a workstation, a mainframe computer or another device capable of manipulating computer-readable data, or between two or more computing systems over a network (such as: the Internet, World Wide Web or WWW, an intranet, a LAN, a WAN, a MAN, a telephone network, a cellular-telephone network, a wireless network, a combination of networks, or other technology enabling communication between computing systems). Therefore, information (such as the set of target patterns or the audio content) may be stored locally (for example, on a client computer) and/or remotely (for example, on a computer or server that is accessed via a network).

Additionally, the electronic device may include: a personal computer, a laptop computer, a cellular telephone, PDA, a handheld device, a portable device, or another electronic device capable of providing information (such as voice messages) over a network (such as: the Internet, World Wide Web or WWW, an intranet, a LAN, a WAN, a MAN, a telephone network, a cellular-telephone network, a wireless network, a combination of networks, or other technology enabling communication between electronic devices and/or computing systems). As an illustration, in the discussion that follows the electronic device is a cellular telephone that communicates information (such as voice messages) from the user via a cellular-telephone network, such as cellular-telephone networks based on: time division multiple access (TDMA), global system for mobile communication (GSM), code division multiple access (CDMA), or other analog and/or digital communication techniques used in conjunction with cellular telephones.

Figure 1:
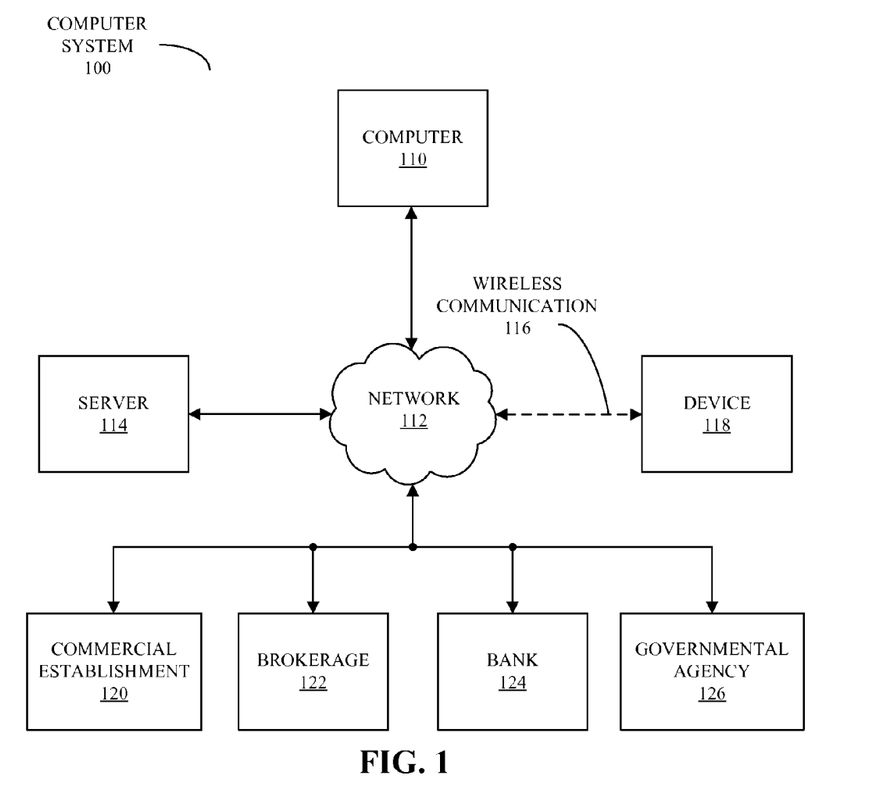
FIG. 1 is a block diagram illustrating a computer system including computers and servers that are networked together in accordance with an embodiment of the present invention.

We now describe embodiments of systems, devices and processes for identifying audio content. FIG. 1 presents a block diagram illustrating a computer system 100, including computers and servers that are networked together. In this computer system, one or more users of devices, such as device 118, may provide one or more data streams that include audio content using wireless communication 116. For example, device 118 may be a cellular telephone and one of the users may provide a voice message that is to be associated with a financial transaction by financial software (such as payroll software, income-tax software, accounting software, and/or customer-relationship-management software) that executes on computer system 100. Consequently, the wireless communication 116 may occur via a cellular-telephone network and/or a wireless network (such as WiFi).

In some embodiments, in order to associate the voice message with the financial transaction, the audio content is first transcribed into text. However, because the quality of the audio content provided by devices such as cellular telephones can vary considerably, both from one device to another and even from phone call to phone call, this transcription process can be challenging. This is particularly the case when the identification problem is weakly constrained. For example, if only a few words are allowed (i.e., a limited grammar) the identification may be easier than if a large dictionary of words is used.

To address this challenge, a set of target patterns (such as information associated with a dictionary of words) that is used by voice-recognition software (including existing voice-recognition software) to identify the audio content may be distorted based on a number of factors. This distortion may be static, for example, a predetermined distortion may be applied to the set of target patterns for: a given user, a given device 118, a given communication service provider, and/or a given type of communication network. For example, the user may be identified using a call identifier (such as the user's telephone number), and the set of target patterns may be appropriately distorted for this user. (Alternatively, the set of target patterns may be pre-distorted for this user, and this pre-distorted set of target patterns may be accessed and used during the identification process.)

In some embodiments, the distortion may be dynamically adjusted, modified or changed based on characteristics of the one or more data streams. For example, the set of target patterns may be dynamically distorted based on a confidence metric provided by the voice-recognition software during the identification process. Moreover, the dynamic distortion may be based on training data that is included in at least one of the data streams and/or which is provided by the given user. This training data may include predetermined audio data, such as: a predetermined phrase that is provided by a given user and/or with a predetermined key-pad pattern on the device 118 that the given user inputs. Alternatively, device 118 may provide the training data without action by the given user.

Note that the distortion may be implemented using one or more filters and/or one or more encoding techniques. For example, the one or more filters may be analog and/or digital filters, including finite-impulse-response filters and/or infinite-impulse-response filters. Additionally, the encoding technique may include a type of moving pictures expert group or MPEG encoding, for example, encoding that has a bandwidth of 8 kHz or 11.5 kHz. This distortion may change an amplitude at a given frequency in a range of audio frequencies associated with the set of target patterns. In an exemplary embodiment, the filtering and/or the encoding technique band limits the set of target patterns. For example, the encoding technique may perform lossy compression of the set of target patterns.

By distorting the set of target patterns prior to identifying the audio content, the technique may provide a better match between the set of target patterns and the spectrum (including the amplitude and the phase) of the audio content. In particular, this technique may allow the voice-recognition software to accommodate variations in audio quality, such as those associated with: wireless communication 116, device 118, and/or a user of device 118.

The voice-recognition software, as well as the set of target patterns, may be stored and/or executed on server 114, which communicates with device 118 via network 112 (such as the Internet) and wireless communication 116. As noted previously, after the audio content has been identified, financial software may associate the audio content with one or more financial transactions, thereby assisting a given user in: generating a payroll, performing accounting, generating an income-tax return, and/or adding or updating customer information in a customer profile.

For example, the user of device 118 may provide a voice message that includes information associated with one or more financial transactions, such as a service performed for a client. Subsequently, this user may access the financial software via computer 110. This financial software may request additional information from the user about the one or more financial transactions. Alternatively and/or additionally, the financial software may collect additional information about the one or more financial transactions. For example, the financial software may access and retrieve remotely stored information associated with the user and/or the user's accounts via network 112. Note that this information may be associated with: a commercial establishment 120, a brokerage 122, a bank 124 (which may include an online bank), and/or a governmental agency 126 (such as the Internal Revenue Service). Once the additional information has been received and/or collected, the financial software may associate this additional information with the audio content or transcribed text associated with the audio content to assist the user.

As noted above, software that distorts the set of target patterns may be a stand-alone application or may be embedded in another application, such as the voice-recognition software. Moreover, the financial software may be a stand-alone application or may be embedded in another application. In one embodiment, the financial software includes software such as: TurboTax™ (from Intuit, Inc., of Mountain View, Calif.), TaxCut™ (from H&R Block, Inc., of Kansas City, Mo.), TaxAct™ (from $2^{nd}$ Story Software, Inc., of Cedar Rapids, Iowa), and/or other software capable of preparing an income-tax return.

Moreover, the financial software may include software such as: QuickBooks™ (from Intuit, Inc., of Mountain View, Calif.), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), FreshBooks™ (from 2nd Site, Inc., of Toronto, Canada), Mint™ (from Mint Software, Inc., of Mountain View, Calif.) and/or other payroll or accounting software capable of processing payroll information. Additionally, in some embodiments the financial software includes software such as: Quicken™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC), and/or other planning software capable of processing financial information.

In some embodiments, the financial software includes software such as QuickBooks Customer Manager™ (from Intuit, Inc., of Mountain View, Calif.) and/or other customer-relationship-management software.

In some embodiments, the financial software is resident on the computer 110. However, other embodiments may utilize a financial tool that is embedded in a web page (once again, either as a stand-alone application or as a portion of another application). This web page may be provided by server 114 via network 112. In an illustrative embodiment, the financial tool is a software package written in: JavaScript™ (e.g., the financial tool includes programs or procedures containing JavaScript instructions), ECMAScript (the specification for which is published by the European Computer Manufacturers Association International), VBScript™ (a trademark of Microsoft, Inc.) or any other client or server-side scripting language or any other client or server-side compiled or machine-code language. In other words, the embedded financial tool may include programs or procedures containing: JavaScript, ECMAScript instructions, VBScript instructions, or instructions in another programming language suitable for rendering by or to a browser or another client application on the computer 110. Note that this rendering may be accomplished directly to device 118, either as audio or some other form, such as a text message. Moreover, the rendering may be in real time as the user speaks. For example, after the user says "Charge 3 hours of bookkeeping to Sams Diner," device 118 may indicate: "Did you say, Charge 3 hours of bookkeeping to Sams Diner?"

In embodiments where the financial tool is embedded in a web page or executes in an environment on computer 110, information associated with one or more financial transactions may be temporarily stored on the computer 110. Subsequently, this information may be provided to the server 114 via the network 112. Moreover, the information stored on the server 114 may be periodically synchronized with the information stored on the computer 110.

Because the information associated with the financial transactions, as well as the associated audio content or transcribed audio content, may be sensitive in nature, in some embodiments such information may be encrypted. Additionally, this information may be encrypted when it is communicated over the network 112. For example, communication may utilize a protocol such as HyperText Transfer Protocol Secure (HTTPS).

Note that in some embodiments the computer system 100 includes fewer or additional components. Moreover, two or more components may be combined into a single component and/or a position of one or more components may be changed.

Figure 2:
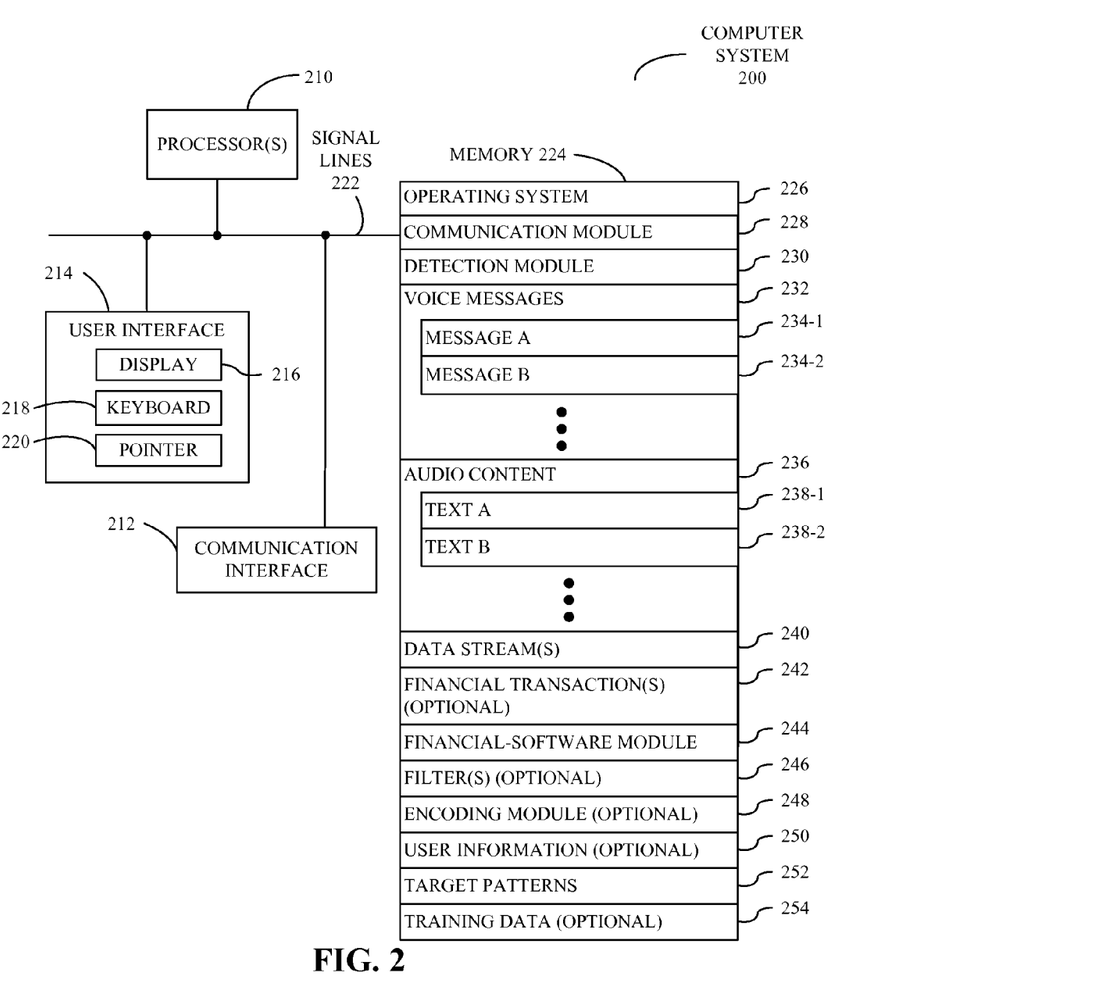
FIG. 2 is a block diagram illustrating a computer system in accordance with an embodiment of the present invention.

FIG. 2 presents a block diagram illustrating a computer system 200. Computer system 200 includes: one or more processors 210, a communication interface 212, a user interface 214, and one or more signal lines 222 coupling these components together. Note that the one or more processing units 210: may support parallel processing and/or multi-threaded operation, the communication interface 212 may have a persistent communication connection, and the one or more signal lines 222 may constitute a communication bus. Moreover, the user interface 214 may include: a display 216, a keyboard 218, and/or a pointer 220, such as a mouse.

Memory 224 in the computer system 200 may include volatile memory and/or non-volatile memory. More specifically, memory 224 may include: ROM, RAM, EPROM, EEPROM, flash, one or more smart cards, one or more magnetic disc storage devices, and/or one or more optical storage devices. Memory 224 may store an operating system 226 that includes procedures (or a set of instructions) for handling various basic system services for performing hardware-dependent tasks. Memory 224 may also store procedures (or a set of instructions) in a communication module 228. These communication procedures may be used for communicating with one or more computers and/or servers, including computers and/or servers that are remotely located with respect to the computer system 200. While not shown in computer system 200, in some embodiments computer system 200 includes a web browser.

Memory 224 may also include multiple program modules (or one or more sets of instructions), including: detection module 230 (or a set of instructions), financial-software module 244 (or a set of instructions), and/or optional encoding module 248 (or a set of instructions). During operation, computer system 200 may receive one or more data streams 240 (such as a data stream that includes session initiation protocol or SIP packets) from a user(s) of one or more devices (not shown), such as one or more cellular telephone, via communication interface 212 and communication module 228. These data streams may include voice messages 232, such as message A 234-1 or message B 234-2. Detection module 230 (such as voice-recognition software) may use target patterns 252 (such as information associated with a dictionary of words) to identify audio content 236, such as text A 238-1 or text B 238-2, in one or more of the voice messages 232. Consequently, in some embodiments detection module 230 transcribes the voice messages 232.

In particular, detection module 230 may identify the audio content 236 by using distorted target patterns. For example, the target patterns 252 may be distorted using one or more optional filters 246 (including analog and/or digital filters) and/or optional encoding module 248 (such as a type of MPEG encoding). This distortion may change an amplitude at a given frequency in a range of audio frequencies associated with the target patterns 252.

Moreover, the distortion may be static or dynamic. For example, based on optional user information 250 (such as a type of cellular telephone, a cellular-telephone service provider, a type of cellular-telephone network, the user, a user identifier, a user account, and/or a user location), a predetermined distortion may be applied to the target patterns 252. (Consequently, in some embodiments the target patterns 252 include distorted target patterns.) In this way, the audio content 236 may be identified even if the audio quality of the one or more data streams 240 varies from one device to another (for example, because of differences in microphone quality) and/or from one user to another.

Alternatively, the distortion may be dynamically adjusted, modified or changed based on characteristics of the one or more data streams 240. For example, the target patterns 252 may be dynamically distorted based on a confidence metric provided by detection module 230 during the identifying. Moreover, the dynamic distortion may be based on optional training data 254 that is included in at least one of the data streams 240. This optional training data may include audio data for predetermined frequencies. In some embodiments, the optional training data 254 is associated with a predetermined phrase that is provided by a given user and/or with a predetermined key-pad pattern on the device (not shown) that the given user inputs. Alternatively, a device (not shown) may provide the optional training data 254 without user action. In this way, the audio content 236 may be identified even if there are changes in the audio quality for the one or more data streams 240 associated with a given user.

After transcribing the voice messages 232, optional financial-software module 244 (such as payroll software, income-tax software, accounting software, and/or customer-relationship-management software) may associate one or more optional financial transactions 242 with the identified audio content 236. For example, one of the users may have a business lunch that is paid for using a credit card. This financial transaction may be aggregated in a database of optional financial transactions 242. In order to comply with income-tax regulations and/or accounting rules, this user may dictate one of the voice messages 232 that identifies the lunch attendees and/or related information using a cellular telephone. The optional financial-software module may associate the transcribed text of this voice message with the credit-card receipt, thereby making it easier for the user to account for this expense.

Instructions in the various modules in the memory 224 may be implemented in: a high-level procedural language, an object-oriented programming language, and/or in an assembly or machine language. Note that the programming language may be compiled or interpreted, e.g., configurable or configured to be executed by the one or more processing units 210.

Although the computer system 200 is illustrated as having a number of discrete items, FIG. 2 is intended to be a functional description of the various features that may be present in the computer system 200 rather than a structural schematic of the embodiments described herein. In practice, and as recognized by those of ordinary skill in the art, the functions of the computer system 200 may be distributed over a large number of servers or computers, with various groups of the servers or computers performing particular subsets of the functions. In some embodiments, some or all of the functionality of the computer system 200 may be implemented in one or more application-specific integrated circuits (ASICs) and/or one or more digital signal processors (DSPs).

Computer system 200 may include fewer components or additional components. Moreover, two or more components may be combined into a single component and/or a position of one or more components may be changed. In some embodiments, the functionality of the computer system 200 may be implemented more in hardware and less in software, or less in hardware and more in software, as is known in the art.

Figure 3:
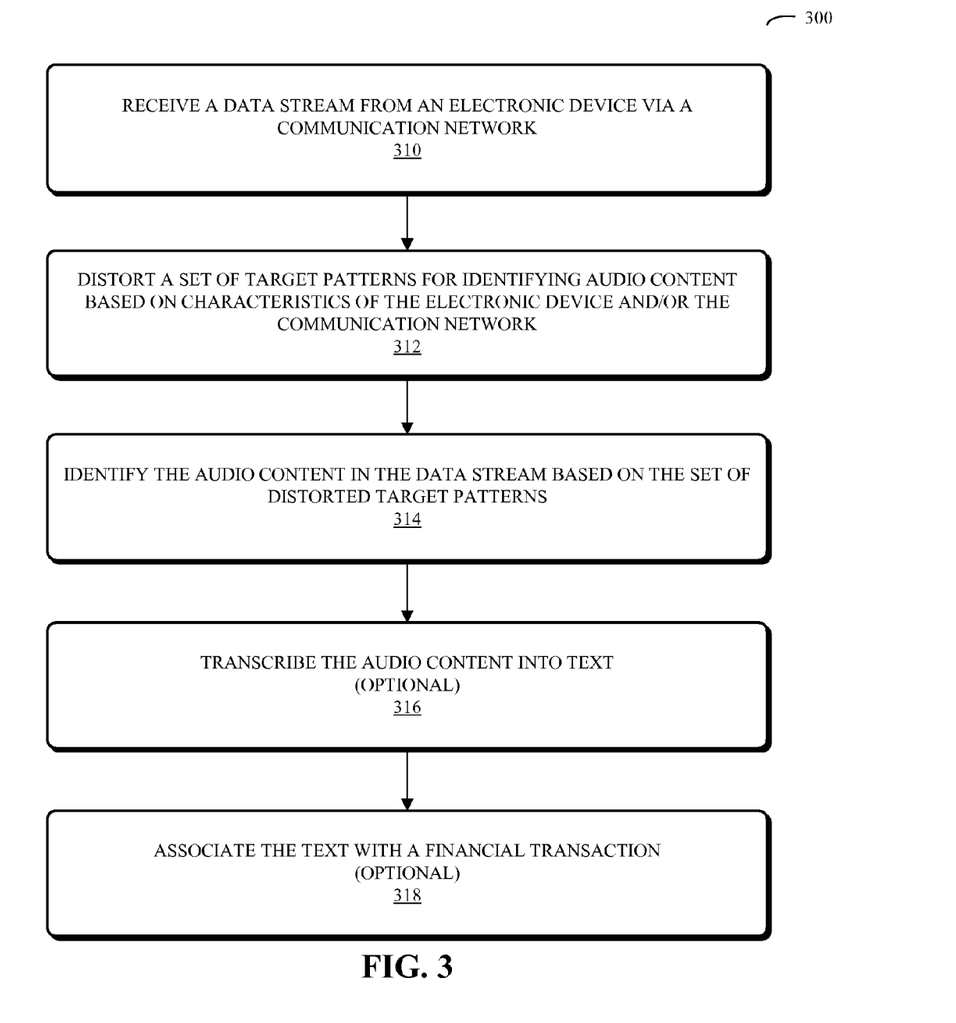
FIG. 3 is a flowchart illustrating a method for identifying audio content in accordance with an embodiment of the present invention.

We now describe embodiments of a method for identifying audio content. FIG. 3 presents a flowchart illustrating a method 300 for identifying audio content, which may be implemented by a computer system. During operation, the computer system receives a data stream from an electronic device via a communication network (310). Then, the computer system distorts a set of target patterns for identifying the audio content based on characteristics of the electronic device and/or the communication network (312). Next, the computer system identifies the audio content in the data stream based on the set of distorted target patterns (314).

In some embodiments, the computer system optionally transcribes the audio content into text (316). Moreover, in some embodiments the computer system optionally associates the text with a financial transaction (318).

Note that in some embodiments of method 300 there may be additional or fewer operations. For example, one the audio content is identified (314) additional operations may be performed, such as scheduling an appointment for the user. Moreover, the order of the operations may be changed and two or more operations may be combined into a single operation.

Figure 4:
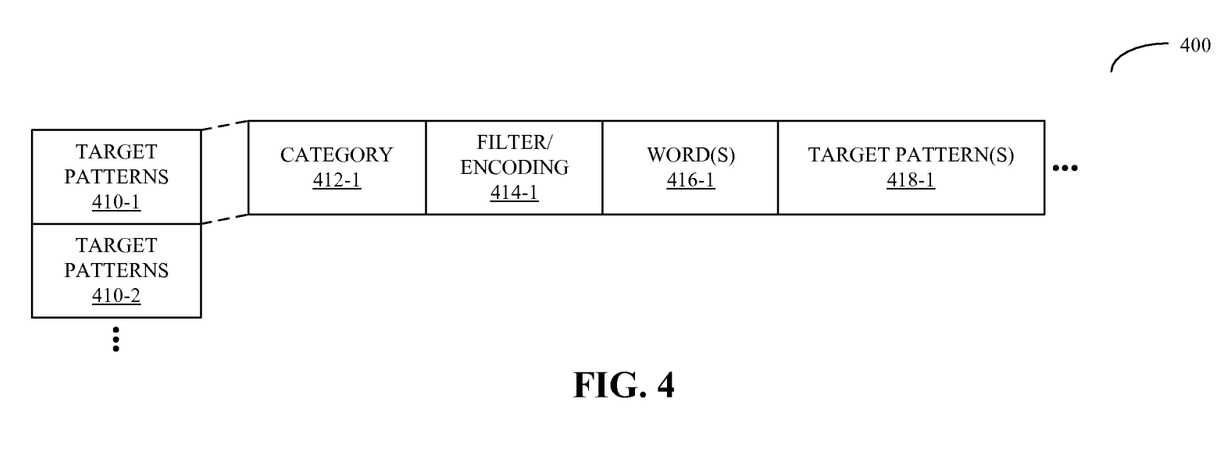
FIG. 4 is a block diagram illustrating a data structure in accordance with an embodiment of the present invention.

We now discuss embodiments of data structures that may be used in the computer system 100 (FIG. 1) and/or 200 (FIG. 2). FIG. 4 presents a block diagram illustrating a data structure 400. This data structure may include multiple target patterns 410, such as information associated with words in a dictionary. For example, target patterns 410-1 may include: a category 412-1 (such as medical terminology), a filter/encoding 414-1 for distorting at least some of target patterns 418-1, words 416-1, and/or the target patterns 418-1 (which, in some embodiments, include distorted target patterns).

Note that in some embodiments of the data structure 400 there may be fewer or additional components. Moreover, two or more components may be combined into a single component and/or a position of one or more components may be changed.

While the preceding embodiments have used financial transactions as an illustrative embodiment, in other embodiments the audio content and/or the transcribed audio content may be associated with health-care transactions and/or medical records of one or more users and/or one or more patients.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying audio content, comprising:
receiving a data stream from an electronic device via a communication network, wherein the data stream includes training data and audio content that is to be identified, and wherein the training data and the audio content in the data stream are distorted by dynamic characteristics of the electronic device and the communication network;
determining, from the received distorted training data in the data stream, dynamic characteristics of the electronic device and the communication network;
dynamically distorting, using a computer, a set of target patterns for identifying the distorted audio content based on the determined dynamic characteristics of the electronic device and the communication network, wherein dynamically distorting the set of target patterns comprises using an encoding technique to perform the distortion; and
identifying the distorted audio content in the data stream based on the set of distorted target patterns, wherein the distorted audio content spectrum matches with the set of distorted target patterns.

2. The method of claim 1, wherein the electronic device includes a cellular telephone; and
wherein the communication network includes a cellular-telephone network.

3. The method of claim 1, wherein communication via the communication network involves wireless communication.

4. The method of claim 1, wherein the audio content includes spoken information.

5. The method of claim 1, wherein the set of target patterns corresponds to a dictionary of words.

6. The method of claim 1, wherein distorting the set of target patterns includes changing an amplitude at a given frequency in a range of audio frequencies associated with the set of target patterns.

7. The method of claim 1, wherein the set of target patterns is distorted using a filter.

8. The method of claim 1, wherein the set of target patterns is distorted based on characteristics associated with a user of the electronic device.

9. The method of claim 1, wherein the training data includes audio data for predetermined frequencies.

10. The method of claim 1, wherein the training data is associated with a predetermined phrase.

11. The method of claim 1, wherein the training data is associated with a predetermined key-pad pattern on the electronic device.

12. The method of claim 1, wherein the training data is provided by the electronic device.

13. The method of claim 1, wherein the training data comprises audio data for a predetermined key-pad pattern on the electronic device that the user inputs.

14. The method of claim 1, further comprising:
transcribing the audio content into text; and
associating the text with a financial transaction for the user based on an identifier for the electronic device.

15. The method of claim 14, wherein financial software performs the associating the text with the financial transaction.

16. The method of claim 15, wherein the financial software includes payroll software, income-tax software, accounting software, or customer-relationship-management software.

17. The method of claim 14, wherein associating the text with a financial transaction further comprises associating the text with the financial transaction based on a location for the user.

18. The method of claim 1, wherein distorting the set of target patterns comprises adjusting a distortion for the set of target patterns based on a confidence metric associated with a process of identifying the audio content.

19. The method of claim 1, wherein the encoding technique comprises lossy compression.

20. A computer-program product for use in conjunction with a computer system, the computer-program product comprising a non-transitory computer-readable storage medium and a computer-program mechanism embedded therein for configuring the computer system, the computer-program mechanism including:
instructions for receiving a data stream from an electronic device via a communication network, wherein the data stream includes training data and audio content that is to be identified, and wherein the training data and the audio content in the data stream are distorted by dynamic characteristics of the electronic device and the communication network;
instructions for determining, from the received distorted training data in the data stream, dynamic characteristics of the electronic device and the communication network;
instructions for dynamically distorting a set of target patterns for identifying the audio content based on the determined dynamic characteristics of the electronic device and the communication network, wherein dynamically distorting the set of target patterns comprises using an encoding technique to perform the distortion; and
instructions for identifying distorted audio content in the data stream based on the set of distorted target patterns, wherein the distorted audio content spectrum matches with the set of distorted target patterns.

21. The computer-program product of claim 20, wherein the electronic device includes a cellular telephone; and
wherein the communication network includes a cellular-telephone network.

22. The computer-program product of claim 20, wherein the audio content includes spoken information.

23. The computer-program product of claim 20, wherein the set of target patterns corresponds to a dictionary of words.

24. The computer-program product of claim 20, wherein the set of target patterns is distorted based on characteristics associated with a user of the electronic device.

25. The computer-program product of claim 20, wherein distorting the set of target patterns comprises adjusting a distortion for the set of target patterns based on a confidence metric associated with a process of identifying the audio content.

26. A computer system, comprising:
- a processor;
- memory;
- a program module, wherein the program module is stored in the memory and configured to be executed by the processor, the program module including:
  - instructions for receiving a data stream from an electronic device via a communication network, wherein the data stream includes training data and audio content that is to be identified, and wherein the training data and the audio content in the data stream are distorted by dynamic characteristics of the electronic device and the communication network;
  - instructions for determining, from the received distorted training data in the data stream, dynamic characteristics of the electronic device and the communication network;
  - instructions for dynamically distorting a set of target patterns for identifying the audio content based on the determined dynamic characteristics of the electronic device and the communication network, wherein distorting the set of target patterns comprises using an encoding technique to perform the distortion;
  - instructions for identifying distorted audio content in the data stream based on the set of distorted target patterns, wherein the distorted audio content spectrum matches with the set of distorted target patterns.

* * * * *